US012007502B2

(12) United States Patent
Jones et al.

(10) Patent No.: US 12,007,502 B2
(45) Date of Patent: Jun. 11, 2024

(54) RF SCENE GENERATION SIMULATION WITH EXTERNAL MARITIME SURFACE

(71) Applicant: Raytheon Company, Tewksbury, MA (US)

(72) Inventors: Jaylan S. Jones, Tucson, AZ (US); Donald M. Jones, Vail, AZ (US)

(73) Assignee: Raytheon Company, Tewksbury, MA (US)

( * ) Notice: Subject to any disclaimer, the term of this patent is extended or adjusted under 35 U.S.C. 154(b) by 946 days.

(21) Appl. No.: 16/999,664

(22) Filed: Aug. 21, 2020

(65) Prior Publication Data

US 2022/0057484 A1 Feb. 24, 2022

(51) Int. Cl.
*H04B 17/391* (2015.01)
*G01S 7/40* (2006.01)
(Continued)

(52) U.S. Cl.
CPC ............ *G01S 7/4052* (2013.01); *G01S 13/89* (2013.01); *H04B 17/3912* (2015.01); *G06F 2111/18* (2020.01)

(58) Field of Classification Search
CPC ...... G01S 7/4052; G01S 13/89; G01S 13/953; G01S 13/956; G01S 13/95; G01S 13/30; G01S 13/282; G01S 13/582; H04B 17/3912; G06F 2111/18; G09B 9/54; Y02A 90/10
(Continued)

(56) References Cited

U.S. PATENT DOCUMENTS 9,651,657 B2 * 5/2017 Sinclair ................ G01S 13/426
10,197,667 B2    2/2019 Reil et al.

FOREIGN PATENT DOCUMENTS

CN    109884633    *  2/2019    ............ G01S 13/90
CN    106646403       12/2019
(Continued)

OTHER PUBLICATIONS

Yang et al., "Modelling and simulation of spatial-temporal correlated k distributed clutter for coherent radar seeker", Jan. 2014, IET Radar, Sonar Navigat., vol. 8, No. 1, pp. 1-8.*
(Continued)

*Primary Examiner* — Juan C Ochoa
(74) *Attorney, Agent, or Firm* — Schwegman Lundberg & Woessner, P.A.

(57) ABSTRACT

Embodiments of a system for simulating a radio frequency (RF) scene associated with a moving maritime surface are generally described herein. An RF scene is generated using an RF scene generation model and a moving maritime surface is generated using a maritime surface model. The RF scene is integrated with the moving maritime surface model. The RF scene generation model is configured to apply a radar model to generate and update the RF scene based on simulated radar returns at a radar pulse repetition frequency (PRF) and the maritime surface model is configured to update the moving maritime surface at a maritime surface update rate, access previous and current maritime surfaces, (Continued)

and interpolate surface facet properties to pulse times of the radar model. The maritime surface model is configured to update the moving maritime surface once every subdwell.

18 Claims, 3 Drawing Sheets

(51) Int. Cl.
 *G01S 13/89* (2006.01)
 *G06F 111/18* (2020.01)
(58) Field of Classification Search
 USPC .......................................................... 703/6, 2
 See application file for complete search history.

(56) References Cited

FOREIGN PATENT DOCUMENTS

| CN | 111175750 | * | 1/2020 | ......... G01S 13/9027 |
| DK | 2811315 | * | 1/2014 | ............... G01S 7/38 |
| WO | WO-2022040424 A1 | | 2/2022 | |

OTHER PUBLICATIONS

Wang et al., "Simulation of correlated low-grazing-angle sea clutter based on phase retrieval", Jul. 2015, IEEE Trans. Geosci. Remote Sens., vol. 53, No. 7, pp. 3917-3930.*

Sandeep Sira et al., "Improving detection in sea clutter using waveform scheduling", 2007, IEEE International Conference on Acoustics, Speech and Signal Processing-ICASSP'07, vol. 3, pp. III-1241 to III-1244.*

"International Application Serial No. PCT US2021 046687, International Search Report dated Dec. 22, 2021", 4 pgs.

"International Application Serial No. PCT US2021 046687, Written Opinion dated Dec. 22, 2021", 7 pgs.

Maurer, D, "Modeling the spectral structure of ducted sea clutter", May 7, 1990; May 7,1990-May 10, 1990 (May 7, 1990), 201-206.

Shi, Sai-Nan, "Low-Velocity Small Target Detection With Doppler-Guided Retrospective Filter in High-Resolution Radar at Fast Scan Mode", IEEE Transactions On Geoscience and Remote Sensing, IEEE, USA, vol. 57, No. 11, (Nov. 1, 2019), 8937-8953.

"International Application Serial No. PCT/US2021/046687, International Preliminary Report on Patentability dated Mar. 2, 2023", 9 pgs.

* cited by examiner

RF SCENE GENERATION SIMULATION WITH EXTERNAL MARITIME SURFACE

TECHNICAL FIELD

Embodiments pertain to radio frequency (RF) scene representations. Some embodiments relate to integration of a moving maritime surface into an RF scene.

BACKGROUND

The use of radio frequency (RF) scene representations in missile 6-Degree of Freedom (6 DoF) simulations has grown in recent years as computing hardware has become powerful enough to complete the simulation calculations in reasonable times. These RF scenes included targets, weather effects, and static clutter. At the same time, models that simulate ocean surface physics and their interactions with surface vessels have been developed for use in similar 6 DoF simulations. Because of the time precision required by RF scene generation, simulating moving ocean surface scattering effects for such an application was computationally intractable.

Thus, there are general needs for improved systems and methods that integrate a moving maritime surface into an RF scene.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Initial attempts to model ocean surfaces in RF scenes lead to static surface models which reduced realism and limited thorough analysis. These models would represent the ocean as a flat surface or waves frozen in time. Further implementations of a moving maritime surface into RF scene-generation were accomplished by updating the ocean surface at the radar's pulse repetition frequency which is orders of magnitude greater than the desired ocean surface update rate. This caused the 6 DoF simulations to require many additional hours of run time to reach completion.

In order to reduce the run-time of a simulation that integrates both RF scene-generation and a moving maritime surface, embodiments disclosed herein disconnect the ocean surface update rate from the radar PRF. This is accomplished at the wrapper level by evolving the maritime surface at an optimal rate for the use case and passing a pointer to the surface object to the RF scene-generator. The RF scene model accesses current and previous maritime surfaces then interpolates the surface facet properties to the time required by the radar. If a radar dwell takes place over two or more maritime surface updates, the simulated radar returns are treated as separate sub-dwells by the RF scene generator and are stitched back together by the wrapper when the dwell is complete. This process may reduce typical simulation run-time by a factor of two.

In some embodiments, each model is driven separately as individual an object which allows independent time evolution. In some embodiments, the maritime surface owns its surface parameters which are available to the RF scene-generator for use. In some embodiments, RF system performance analysis in maritime environments is now feasible.

Embodiments are directed to simulating a radio frequency (RF) scene associated with a moving maritime surface, Some embodiments are directed to a non-transitory computer-readable storage medium that stores instructions for execution by processing circuitry. The instructions may configure the processing circuitry to simulate an RF scene associated with a moving maritime surface.

In some of these embodiments, an RF scene may be generated using an RF scene generation model and a moving maritime surface may be generated using a maritime surface model and the RF scene may be integrated with the moving maritime surface.

Figure 1:
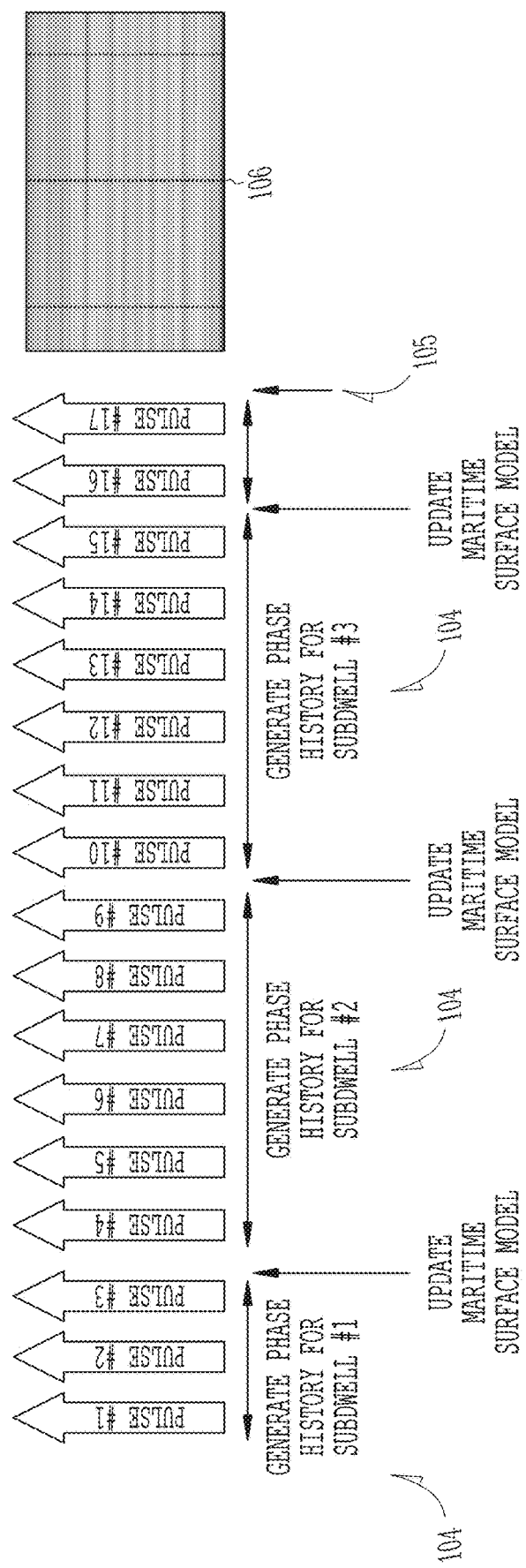
FIG. 1 illustrates maritime surface model updating in accordance with some embodiments.

FIG. 1 illustrates maritime surface model updating in accordance with some embodiments. In these embodiments, the RF scene generation model may be configured to apply a radar model to generate and update the RF scene based on simulated radar returns at a radar pulse repetition frequency (PRF). In these embodiments, the maritime surface model may be configured to update the moving maritime surface at a maritime surface update rate, access previous and current maritime surfaces, and interpolate surface facet properties to pulse times of the radar model. In some embodiments, the maritime surface model may be configured to update the moving maritime surface once every subdwell 104 of a plurality of subdwells 104 comprising a radar dwell time. Each subdwell 104 may comprise a plurality of simulated radar pulses 102.

In some embodiments, the maritime surface update rate may be a fixed rate (e.g., once every second). In some embodiments, the maritime surface update rate may comprise a predetermined number of radar pulses 102 (i.e., several hundred to several thousand), although the scope of the embodiments is not limited in this respect.

In some embodiments, for a radar dwell that takes place over two or more maritime surface updates, the simulated radar returns may be treated as separate sub-dwells by the RF scene generation model to allow phase histories of the simulated radar returns to be concatenated (at time 105) based on pulse index when the radar dwell is complete, although the scope of the embodiments is not limited in this respect. In these embodiments, a driver (e.g., driver software) may implement a wrapper around the RF scene generation model and the maritime surface model allowing the phase histories of the simulated radar returns to be concatenated together.

In some embodiments, the RF scene generation model and the maritime surface model are driven separately as individual software objects to allow for independent time evolution to allow the maritime surface model to be updated per subdwell, although the scope of the embodiments is not limited in this respect. These embodiments allow for the maritime surface model to be updated at a per-subdwell 104 rate rather than at the radar pulse repetition rate.

In some embodiments, the instructions may be configured for integration in a system performance suite (i.e., a system hardware test environment) comprising a six degrees-offreedom (6 DOF) system simulation, although the scope of the embodiments is not limited in this respect.

In some embodiments, prior to interpolation of the surface facet properties, the maritime surface model may be configured to update the moving maritime surface a predetermined number of times, although the scope of the embodiments is not limited in this respect. In some embodiments, at least three maritime surface updates may be needed prior to interpolation, although the scope of the embodiments is not limited in this respect.

In some embodiments, to interpolate the surface facet properties for an update of the moving maritime surface, the maritime surface model may be configured to perform a logarithmic interpolation of whitewater/whitecap properties of surface facets, perform a quadratic interpolation of height and/or position properties of the surface facets, and perform a linear interpolation of velocity properties of the surface facets, although the scope of the embodiments is not limited in this respect. In these embodiments, a facet may be viewed as a small patch of ocean and the facets which are interpolated to represent the sea surface.

In some embodiments, the RF scene generation model may be configured to interpolate the surface facet properties per radar pulse 102, although the scope of the embodiments is not limited in this respect.

In some embodiments, when any of the radar pulses 102 of the radar dwell remain un-simulated by the RF scene generation model, the RF scene generation model may be configured to interpolate the surface facet properties per pulse for each of the remaining un-simulated pulses. The RF scene generation model may be configured to refrain from concatenation of the phase histories of the simulated radar returns until all radar pulses 102 of the radar dwell are simulated, although the scope of the embodiments is not limited in this respect.

In some embodiments, a phase history may be generated for each subdwell, and the phase histories of the subdwells 104 may be concatenated to generate a dwell phase history 106 for the radar dwell. The dwell phase history may be passed on to a RF seeker simulator for additional signal processing for a full radar dwell, although the scope of the embodiments is not limited in this respect. In some embodiments, the additional signal processing comprises one or more of performance of motion compensation, range compression, and Doppler compression, although the scope of the embodiments is not limited in this respect. In some embodiments, the processing circuitry may be configured to store the phase history for each subdwell 104 in memory.

In some embodiments, the processing circuitry may calculate a maximum number of pulses before a next maritime surface update and update other dwell parameters.

Figure 2:
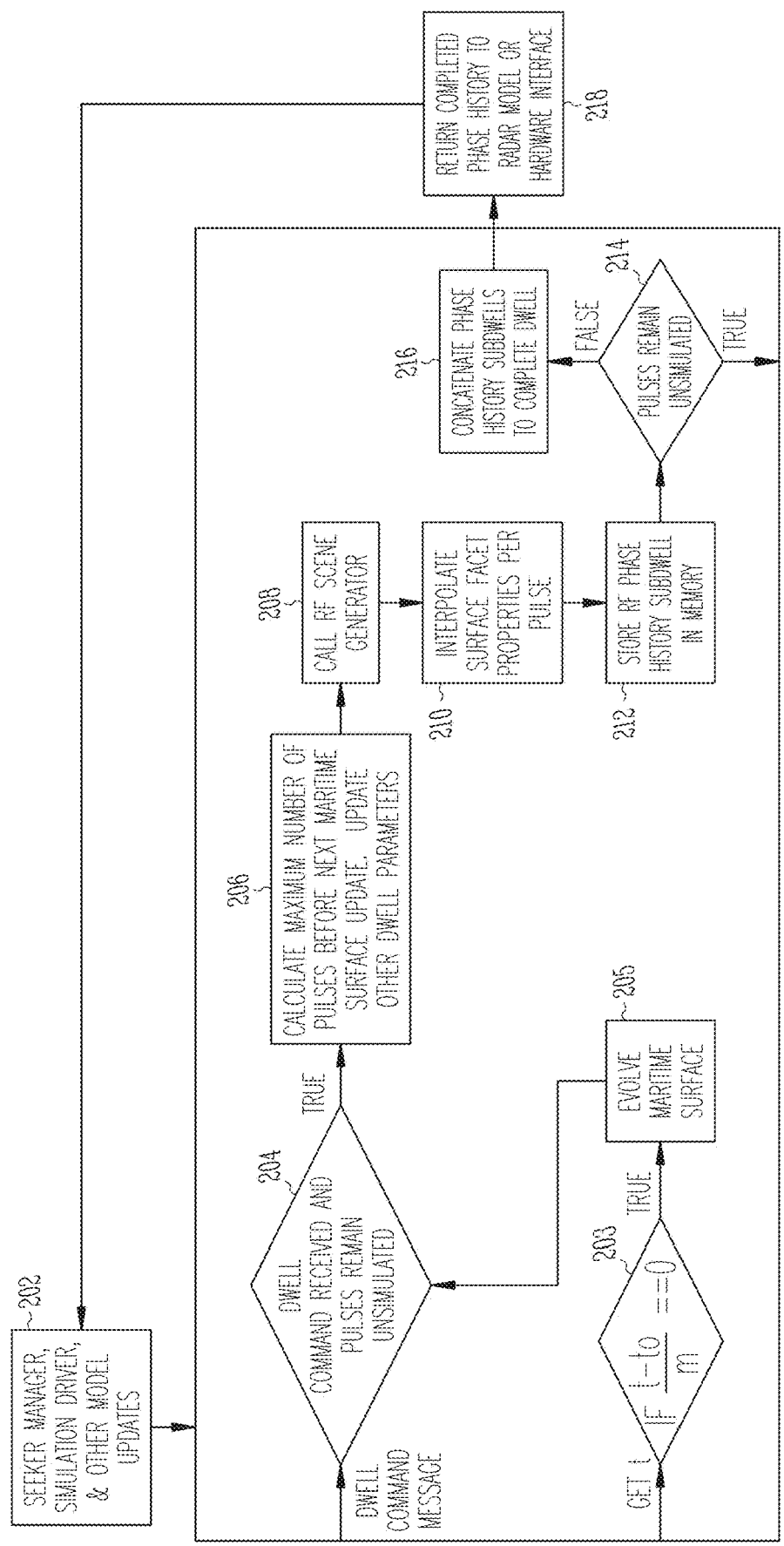
FIG. 2 illustrates a process for simulating an RF scene in accordance with some embodiments.

FIG. 2 illustrates a process for simulating an RF scene in accordance with some embodiments. As illustrated in FIG. 2, in some embodiments, a simulation driver 202 may perform master simulation loop comprising operations 204, 206, 208, 210, 212 and 214 in response to a dwell command until no pulses remain un-simulated. Operations 203 and 205 are configured to evolve the maritime surface each subdwell based on update interval (m) between the maritime surface and the RF scene generator updates. Once all pulses of a dwell are simulated, phase histories of the subdwells are concatenated in operation 216 and returned in operation 218.

Embodiments disclosed herein make use of a high-fidelity, moving, maritime surface model with RF scene generation feasible in a performance simulation environment, where the ocean surface evolves throughout the simulation run with multiple active radar dwells commanded. Some embodiments may be suitable for simulating missile behavior and performance for missiles using RF seekers in a maritime environment, although the scope of the embodiment is not limited in this respect.

Some embodiments leverage interpolation between two or more ocean surfaces in time to allow the maritime surface simulation to be driven independently of the RF scene generator, which may reduce computation time and frees the maritime surface to be able to drive vehicle 6 DoF data in a performance simulation environment. The reduction of surface updates may be by a factor on the order of (PRF/Surface update frequency) which is often on the order of 800×. Instead of updating the ocean surface to the specific time a pulse occurs, which is computationally intense, each facet's properties may be interpolated to that point in time between past and future surface states and those facet properties may be used for the RF reflections for the given pulse.

Some embodiments may be implemented in a prototype standalone driver. Some embodiments may be integrated into the RF scene generation driver.

Figure 3:
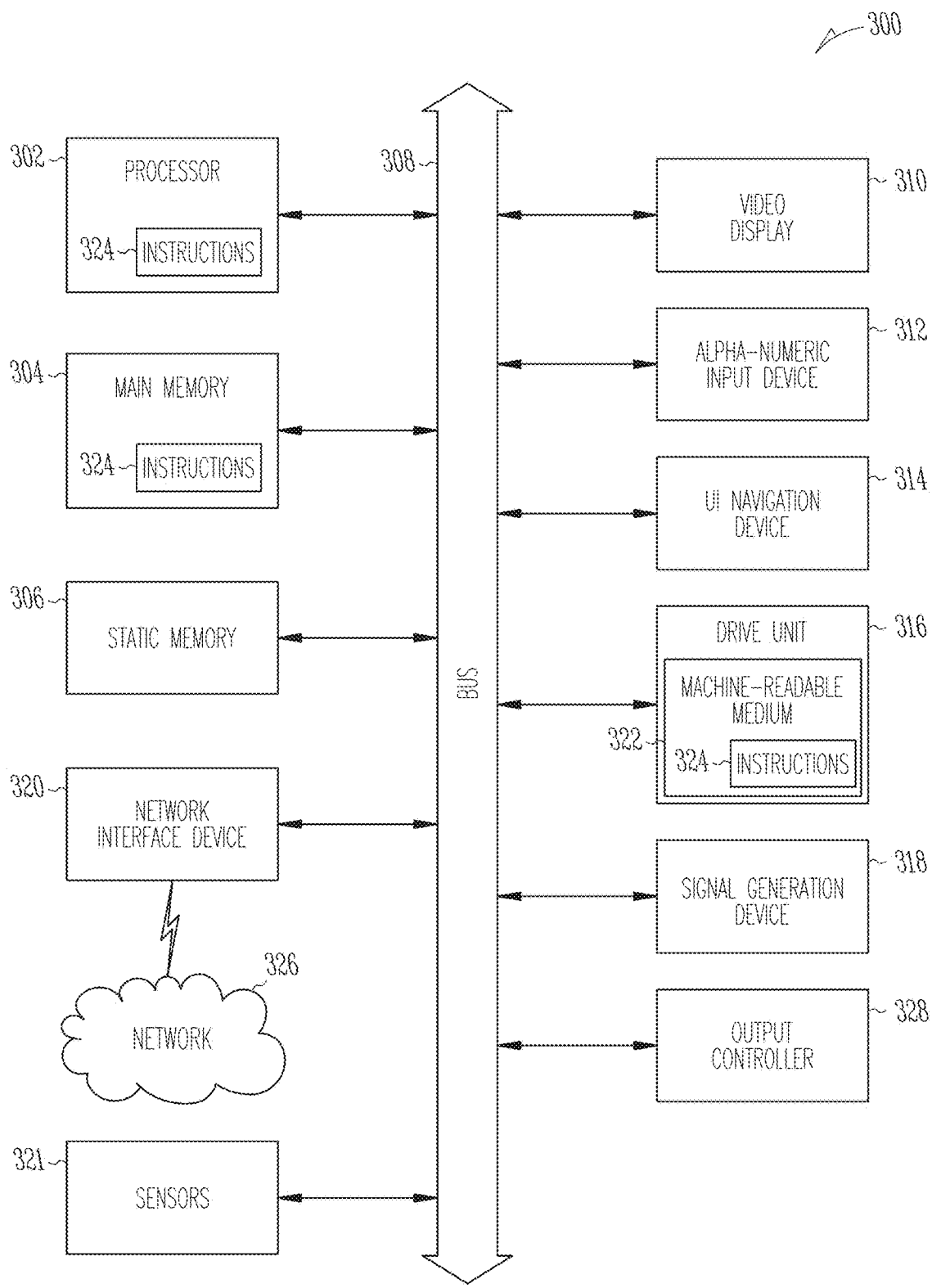
FIG. 3 illustrates a block diagram of an example machine 300 upon which any one or more of the techniques (e.g., methodologies) discussed herein may be performed.

FIG. 3 illustrates a block diagram of an example machine 300 upon which any one or more of the techniques (e.g., methodologies) discussed herein may be performed. In alternative embodiments, the machine 300 may operate as a standalone device or may be connected (e.g., networked) to other machines. In a networked deployment, the machine 300 may operate in the capacity of a server machine, a client machine, or both in server-client network environments. In an example, the machine 300 may act as a peer machine in peer-to-peer (P2P) (or other distributed) network environment. The machine 300 may be system simulator (configured to perform the operations described above and illustrated in FIG. 2), a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a non-transitory computer-readable storage medium. In an example, the software, when executed by the underlying hardware of the module, causes the hardware to perform the specified operations. In some embodiments, the non-transitory computer-readable storage medium may store instructions for execution by one or more processors or processing circuitry, to perform the operations described herein. In some embodiments, the instructions may configure the processing circuitry to simulate a radio frequency (RF) scene associated with a moving maritime surface.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 300 may include processing circuitry such as a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. The machine 300 may further include a display unit 310, an alphanumeric input device 312 (e.g., a keyboard), and a user interface (UI) navigation device 314 (e.g., a mouse). In an example, the display unit 310, input device 312 and UI navigation device 314 may be a touch screen display. The machine 300 may additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The machine 300 may include an output controller 328, such as a serial (e.g., universal serial bus (USB), parallel, or other wired or wireless (e.g., infrared (IR), near field communication (NFC), etc. connection to communicate or control one or more peripheral devices (e.g., a printer, card reader, etc.).

The storage device 316 may include a machine readable medium 322 on which is stored one or more sets of data structures or instructions 324 (e.g., software) embodying or utilized by any one or more of the techniques or functions described herein. The instructions 324 may also reside, completely or at least partially, within the main memory 304, within static memory 306, or within the hardware processor 302 during execution thereof by the machine 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or carrying instructions for execution by the machine 300 and that cause the machine 300 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A non-transitory computer-readable storage medium that stores instructions for execution by processing circuitry, the instructions to configure the processing circuitry to simulate a radio frequency (RF) scene associated with a moving maritime surface,
    wherein instructions configure the processing circuitry to:
    generate an RF scene using an RF scene generation model;
    generate the moving maritime surface using a maritime surface model; and
    integrate the RF scene and the moving maritime surface,
    wherein the RF scene generation model is configured to apply a radar model to generate and update the RF scene based on simulated radar returns at a radar pulse repetition frequency (PRF), and
    wherein the maritime surface model is configured to update the moving maritime surface at a maritime surface update rate, access previous and current maritime surfaces, and interpolate surface facet properties to pulse times of the radar model,
    wherein the maritime surface model is configured to update the moving maritime surface once every subdwell of a plurality of subdwells comprising a radar dwell time, each subdwell comprising a plurality of simulated radar pulses, and
    wherein the RF scene generation model and the maritime surface model are driven separately as individual software objects to allow the maritime surface model to update the moving maritime surface per subdwell rather than at the radar pulse repetition frequency, the maritime surface update rate being less than the radar pulse repetition frequency.

2. The non-transitory computer-readable storage medium of claim 1 wherein for a radar dwell that takes place over two or more maritime surface updates, the simulated radar returns are treated as separate subdwells by the RF scene generation model to allow phase histories of the simulated radar returns to be concatenated based on pulse index when the radar dwell is complete.

3. The non-transitory computer-readable storage medium of claim 2, wherein the instructions are configured for integration in a system performance suite comprising a six degrees-of-freedom (6DOF) system simulation.

4. The non-transitory computer-readable storage medium of claim 3, wherein prior to interpolation of the surface facet properties, the maritime surface model is configured to update the moving maritime surface a predetermined number of times.

5. The non-transitory computer-readable storage medium of claim 4 wherein to interpolate the surface facet properties for an update of the moving maritime surface, the processing circuitry configures the maritime surface model to:
perform a logarithmic interpolation of whitewater/whitecap properties of surface facets;
perform a quadratic interpolation of height and/or position properties of the surface facets; and
perform a linear interpolation of velocity properties of the surface facets,
wherein each surface facet is associated with a patch of the moving maritime surface, and
wherein the RF scene generation model is configured to interpolate the surface facet properties per radar pulse.

6. The non-transitory computer-readable storage medium of claim 5, wherein when any of the radar pulses of the radar dwell remain un-simulated by the RF scene generation model, the processing circuitry is configured to configure the RF scene generation model to interpolate the surface facet properties per pulse for each of the remaining unstimulated pulses, and
refrain from concatenation of the phase histories of the simulated radar returns until all radar pulses of the radar dwell are simulated.

7. The non-transitory computer-readable storage medium of claim 6 wherein the processing circuitry is configured to generate a phase history for each subdwell, concatenate the phase histories of the subdwells to generate a dwell phase history for the radar dwell, and pass the dwell phase history on to a RF seeker simulator for additional signal processing.

8. The non-transitory computer-readable storage medium of claim 7 wherein the additional signal processing comprises one or more of performance of motion compensation, range compression, and Doppler compression.

9. The non-transitory computer-readable storage medium of claim 8, wherein the processing circuitry is configured to store the phase history for each subdwell in memory.

10. A system for simulating a radio frequency (RF) scene associated with a moving maritime surface, the system comprising: processing circuitry; and memory, wherein the processing circuitry is configured to:
generate an RF scene using an RF scene generation model;
generate the moving maritime surface using a maritime surface model; and
integrate the RF scene and the moving maritime surface,
wherein the RF scene generation model is configured to apply a radar model to generate and update the RF scene based on simulated radar returns at a radar pulse repetition frequency (PRF), and
wherein the maritime surface model is configured to update the moving maritime surface at a maritime surface update rate, access previous and current maritime surfaces, and interpolate surface facet properties to pulse times of the radar model,
wherein the maritime surface model is configured to update the moving maritime surface once every subdwell of a plurality of subdwells comprising a radar dwell time, each subdwell comprising a plurality of simulated radar pulses, and
wherein the RF scene generation model and the maritime surface model are driven separately as individual software objects to allow the maritime surface model to update the moving maritime surface per subdwell rather than at the radar pulse repetition frequency, the maritime surface update rate being less than the radar pulse repetition frequency.

11. The system of claim 10 wherein for a radar dwell that takes place over two or more maritime surface updates, the simulated radar returns are treated as separate subdwells by the RF scene generation model to allow phase histories of the simulated radar returns to be concatenated based on pulse index when the radar dwell is complete.

12. The system of claim 11, wherein instructions executed by the processing circuitry for simulating the RF scene associated with the moving maritime surface are configured for integration in a system performance suite comprising a six degrees-of-freedom (6DOF) system simulation.

13. The system of claim 12, wherein prior to interpolation of the surface facet properties, the maritime surface model is configured to update the moving maritime surface a predetermined number of times.

14. The system of claim 13 wherein to interpolate the surface facet properties for an update of the moving maritime surface, the processing circuitry configures the maritime surface model to:
perform a logarithmic interpolation of whitewater/whitecap properties of surface facets;
perform a quadratic interpolation of height and/or position properties of the surface facets; and
perform a linear interpolation of velocity properties of the surface facets,
wherein each surface facet is associated with a patch of the moving maritime surface, and
wherein the RF scene generation model is configured to interpolate the surface facet properties per radar pulse.

15. The system of claim 14, wherein when any of the radar pulses of the radar dwell remain un-simulated by the RF scene generation model, the processing circuitry is configured to configure the RF scene generation model to interpolate the surface facet properties per pulse for each of the remaining un-simulated pulses, and
refrain from concatenation of the phase histories of the simulated radar returns until all radar pulses of the radar dwell are simulated.

16. The system of claim 15 wherein the processing circuitry is configured to generate a phase history for each subdwell, concatenate the phase histories of the subdwells to generate a dwell phase history for the radar dwell, and pass the dwell phase history on to a RF seeker simulator for additional signal processing.

17. The system of claim 16 wherein the additional signal processing comprises one or more of performance of motion compensation, range compression, and Doppler compression.

18. The system of claim 17, wherein the processing circuitry is configured to store the phase history for each subdwell in the memory.

\* \* \* \* \*

UNITED STATES PATENT AND TRADEMARK OFFICE
CERTIFICATE OF CORRECTION

PATENT NO. : 12,007,502 B2
APPLICATION NO. : 16/999664
DATED : June 11, 2024
INVENTOR(S) : Jones et al.

Page 1 of 1

It is certified that error appears in the above-identified patent and that said Letters Patent is hereby corrected as shown below:

In the Specification

In Column 1, Line 13, delete "(6 DoF)" and insert --(6DoF)-- therefor

In Column 1, Line 19, delete "6 DoF" and insert --6DoF-- therefor

In Column 1, Line 56, delete "6 DoF" and insert --6DoF-- therefor

In Column 2, Line 13, delete "surface," and insert --surface.-- therefor

In Column 3, Line 1, delete "(6 DOF)" and insert --(6DOF)-- therefor

In Column 4, Line 9, delete "6 DoF" and insert --6DoF-- therefor

In Column 5, Line 39, delete "etc." and insert --etc.)-- therefor

In the Claims

In Column 7, Line 20, in Claim 6, delete "unstimulated" and insert --un-simulated-- therefor Signed and Sealed this
Twenty-fifth Day of February, 2025

Coke Morgan Stewart
*Acting Director of the United States Patent and Trademark Office*